(12) United States Patent
Ingbir et al.

(10) Patent No.: US 6,377,824 B1
(45) Date of Patent: Apr. 23, 2002

(54) RADIATION-FREE CELLULAR TELEPHONE SYSTEM

(75) Inventors: Ronen Ingbir, Ramat Ef'al; Amir Berlad; Yariv Cohen, both of Giv'atayim; Roy Beck, Ramat Ef'al, all of (IL)

(73) Assignee: Silver Helm, Inc., Wilmington, DE (US)

( * ) Notice: Subject to any disclaimer, the term of this patent is extended or adjusted under 35 U.S.C. 154(b) by 0 days.

(21) Appl. No.: 09/589,366

(22) Filed: Jun. 8, 2000

(51) Int. Cl.$^7$ ................................. H04B 1/38
(52) U.S. Cl. ................. 455/568; 455/569; 455/90; 455/575
(58) Field of Search .................. 455/569, 550, 455/575, 90, 568; 379/430, 431, 429, 437, 440, 433; 381/150, 370, 380, 189, 183

(56) References Cited

U.S. PATENT DOCUMENTS

| | | | | |
|---|---|---|---|---|
| 3,916,312 A | * | 10/1975 | Campbell | 455/575 |
| 4,090,042 A | * | 5/1978 | Larkin | 379/430 |
| 4,864,610 A | * | 9/1989 | Stevens | 379/431 |
| 5,528,689 A | * | 6/1996 | Chan | 379/430 |
| 5,613,222 A | * | 3/1997 | Guenther | 455/90 |
| 6,181,801 B1 | * | 1/2001 | Puthuff et al. | 381/380 |
| 6,272,362 B1 | * | 8/2001 | Wang | 455/569 |

* cited by examiner

*Primary Examiner*—Lester G. Kincaid
(74) *Attorney, Agent, or Firm*—Mark M. Friedman

(57) ABSTRACT

A cell phone with radiation-free sound transmission system is the subject of this invention. By converting electric signals into sound waves that are transmitted through acoustical tubes, the exposure of user to hazardous electromagnetic radiation is significantly reduced, compared to ordinary cellular telephones.

15 Claims, 12 Drawing Sheets

18

19

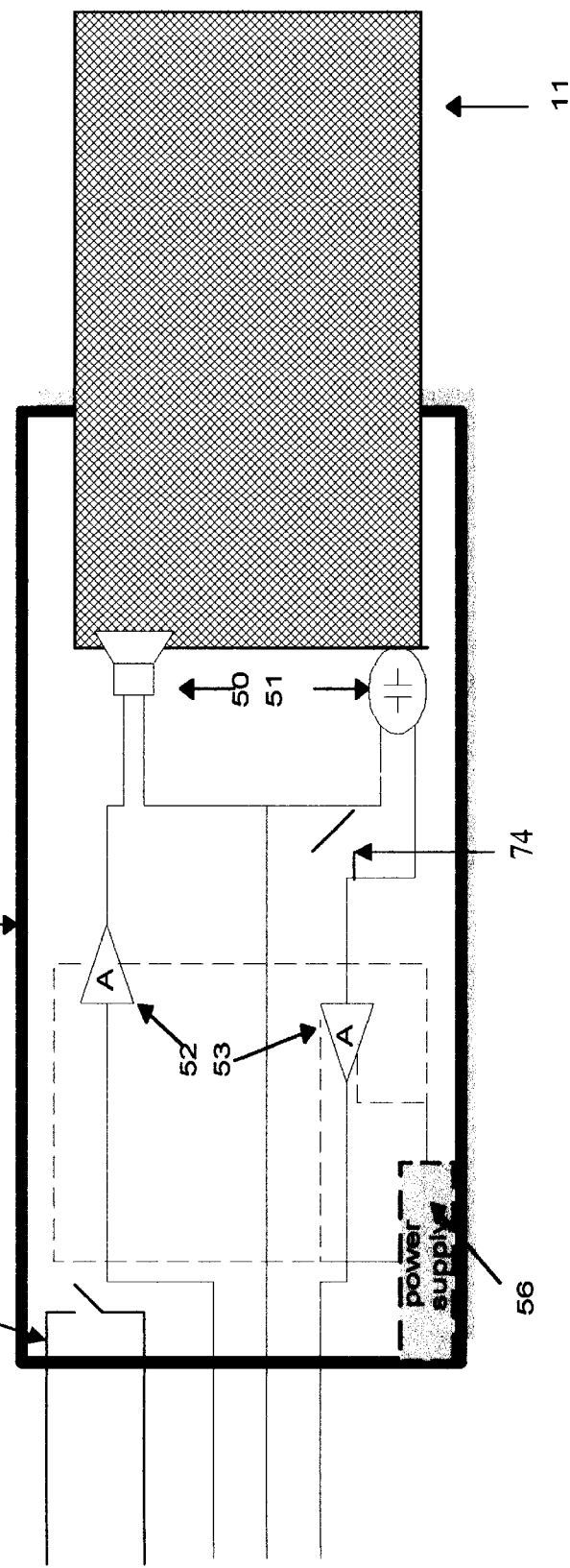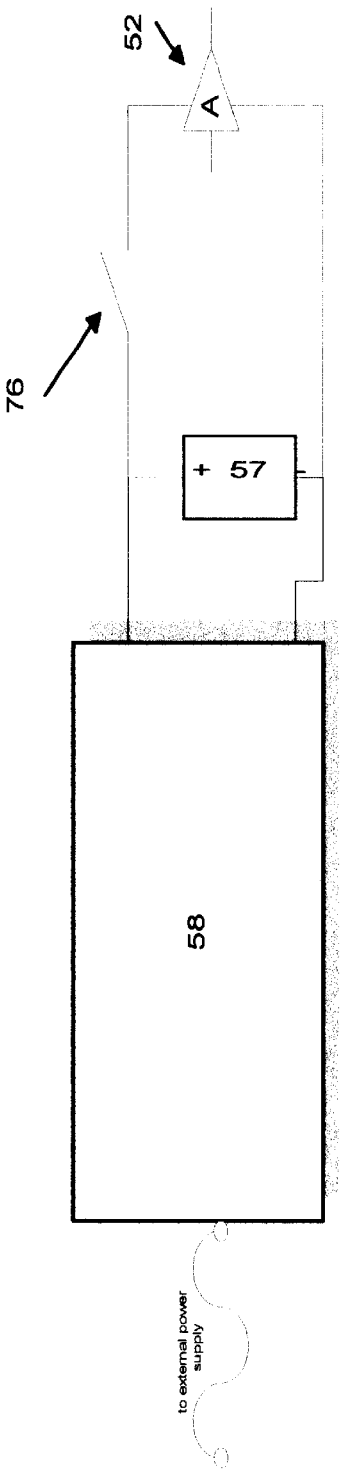

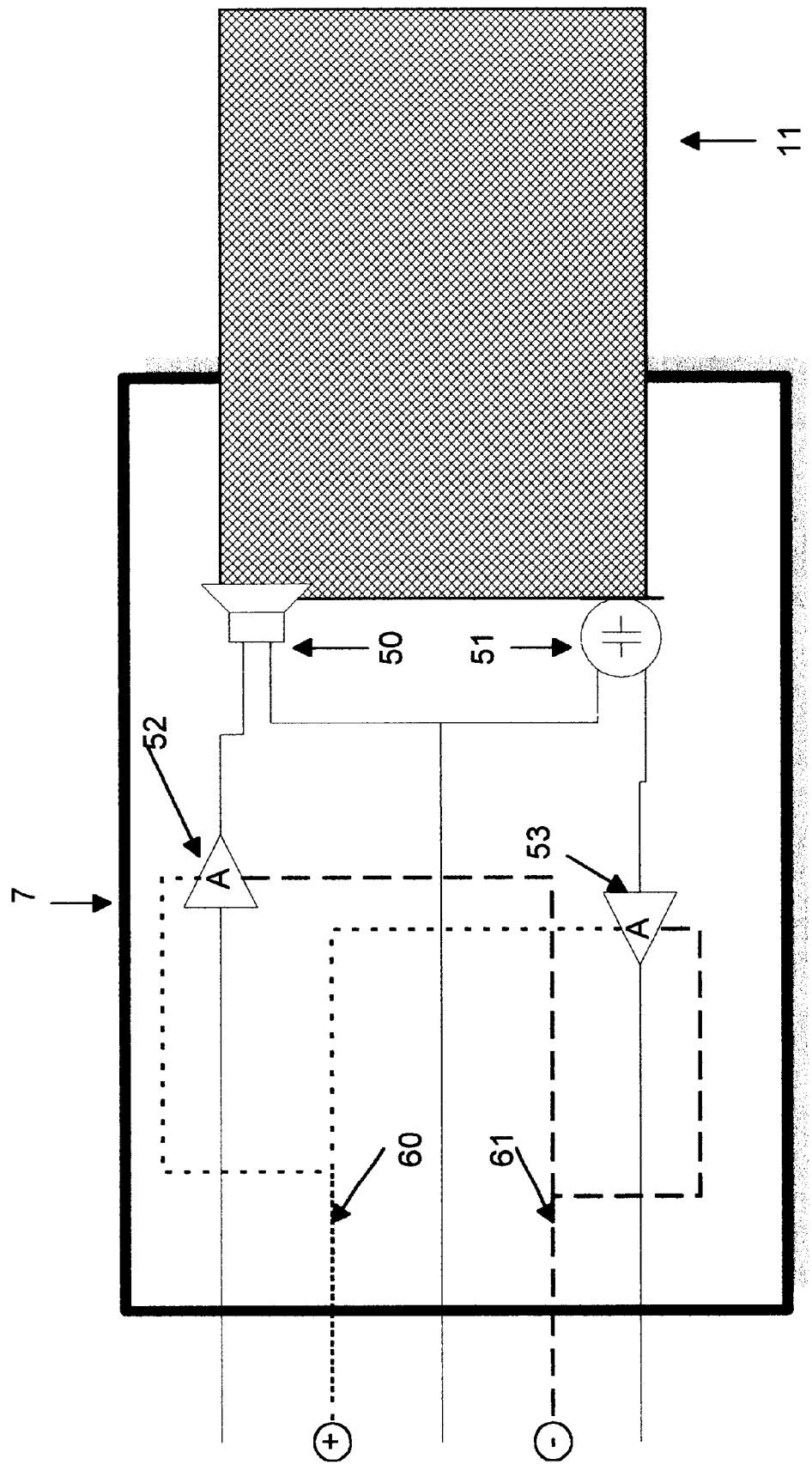

RADIATION-FREE CELLULAR TELEPHONE SYSTEM

BACKGROUND OF THE INVENTION

1. Field of the Invention

The present invention relates to cellular telephones and, more particularly, to a system for using a cellular telephone without producing potentially hazardous radiation near the body of users.

2. Description of the Prior Art

Cellular phones are becoming omnipresent and necessary elements as society enters the new millennium. Unfortunately, operating on radio frequency transmission, these are also sources of electromagnetic radiation. Most phones include an antenna that is placed close to the user's head, emitted radiation and suspected to be hazardous to users. Attempts to reduce the emitted radiation by placing a shield around the antenna, have been found to be impractical and thus have not been commonly employed in cellular telephones. Another proposed solution is to avoid placing the antenna near the head of the user. Proposed and now commonly available is an electrical wire that is connected to the telephone at the input/output port of the cellular phone and terminating with an earpiece that is placed in the user's ear. A microphone is mounted on the wire near the earpiece, putting it at the level of the mouth of the user when the earpiece is placed in the ear. In such an arrangement, the telephone may be clipped to a user's belt or placed in a pocket or a purse, with the wire extending therefrom. The earpiece is placed in the user's ear.

When the user receives or makes a telephone call, the user merely activates the "send" or similar button on the cellular telephone to complete the call hands free. The user hears through the earpiece, the other party hearing the user through the signal picked up by the microphone which is in proximity of the mouth. Another configuration of cellular telephones in use includes a loudspeaker coupled directly to and mounted on a cellular telephone. The user can hear the emitted sounds with no need to hold the cellular telephone close to head. However, since a loudspeaker is used instead of a microphone, privacy is denied unless the user is alone.

Not only do these solutions provide for hands free operation of the telephone, they were also believed to have resolved the problem of unwanted radiation near the user's head, the telephone being remote therefrom. Unfortunately, recent studies conducted in Britain in 2000 have shown that such a wire configuration does not reduce radiation near the user's head.

There have been number of attempts aimed at solving the problem of potentially hazardous radiation emitted from cellular telephones.

U.S. Pat. No. 4,090,042 relates to acoustical communications headset including tubes for the transmission of sound.

U.S. Pat. No. 5,528,689 relates to a method for converting a cellular telephone into a headset telephone. U-shaped clips are used for attaching a mouth cup and an ear cup to the cellular telephone. However, there is still a problem that might evolve from disposition of these cups. Such disposition will interfere significantly with the smooth operation of the cellular telephone, since too much noise from the surroundings might be picked up by the microphone, or alternatively mask the sound coming from the earpiece. In addition, headset adjustment to user's head is done by a complicated mechanism that may easily dismembered.

U.S. Pat. No. 5,613,222 relates to a hands-free cellular phone that employ acoustical tubes. A receiving cup is attached to the speaker of the cellular telephone by loop type Velcro fasteners. However, Velcro straps can still be bulky and accidentally detached. Such disposition will interfere significantly with smooth operation of the cellular telephone, since too much ambient noise from surrounding might be picked up by the microphone.

While these devices fulfill their particular objectives and requirements the aforementioned devices are not effective when the telephone has to be located more than ten feet away from the user, since longer acoustical tubes absorbs too much noise from surroundings.

In addition, receiving and transmitting of sound waves between the cellular phone and the user is not mediated by any apparatus capable of amplifying, coding, decoding, filtering, or conferring any other change on the sounds heard or spoken. Such apparatus, hereafter called a conversion device, is required especially when using the cellular phone near a source of loud noise. There is therefore a need for producing a cellular telephone employing acoustical tubing that can be employed in a noisy environment.

SUMMARY OF THE INVENTION

The present invention relates to cellular phone systems which use acoustical tubes for the transmission of sound. The present invention successfully addresses the shortcomings of the prior art by transmitting sound signals between the telephone and earpiece or microphone via a combination of electrical wire and acoustical tube connected end to end by a novel conversion device.

This conversion device may be connected to any kind of electrical output of mobile telephones and other apparatus. Hence, there is no need to make any changes in the configuration of existing mobile telephone in order to use this system.

In these respects, the present invention substantially departs from the conventional concepts and designs of the prior art, and in so doing provides an apparatus primarily developed for the purpose of communicating near loud noise sources.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 13 is a diagram of a conversion device including an amplifier connected to the earpiece and another amplifier connected to the microphone. A power supply is connected to both amplifiers;

FIG. 14 is a diagram of a power supplier circuit coupled to a charger.

FIG. 15 is a diagram of a conversion device including one amplifier connected to the earpiece and one amplifier connected to the microphone. Power to the amplifiers is supplied from the mobile telephone;

DETAILED DESCRIPTION OF THE INVENTION

Figure 1:
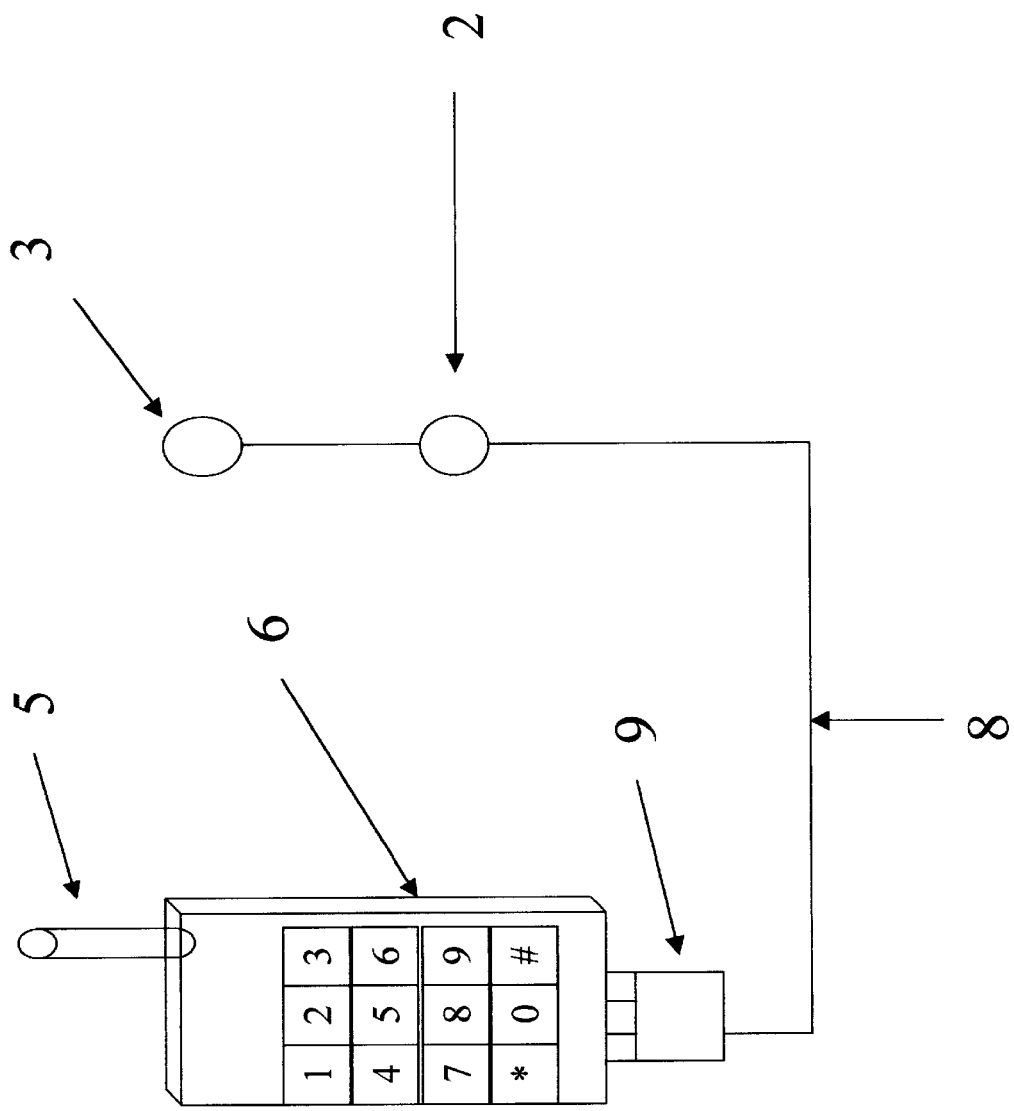
FIG. 1 shows a prior art cellular telephone coupled to an earpiece and a microphone via an electrical wire.

For purposes of better understanding of the present invention, as illustrated in the drawings, reference is first made to the construction and operation of a conventional prior art cell phone as illustrated in FIG. 1. Such a conventional cell phone 6 may be connected to a microphone 2 and an earpiece 3 via an electrical wire 8. Such wire, like the antenna 5, is a source of electromagnetic radiation which present potential health hazards to the user.

The principles and operation of a system according to the present invention may be better understood with reference to the drawings and accompanying descriptions.

Figure 2:
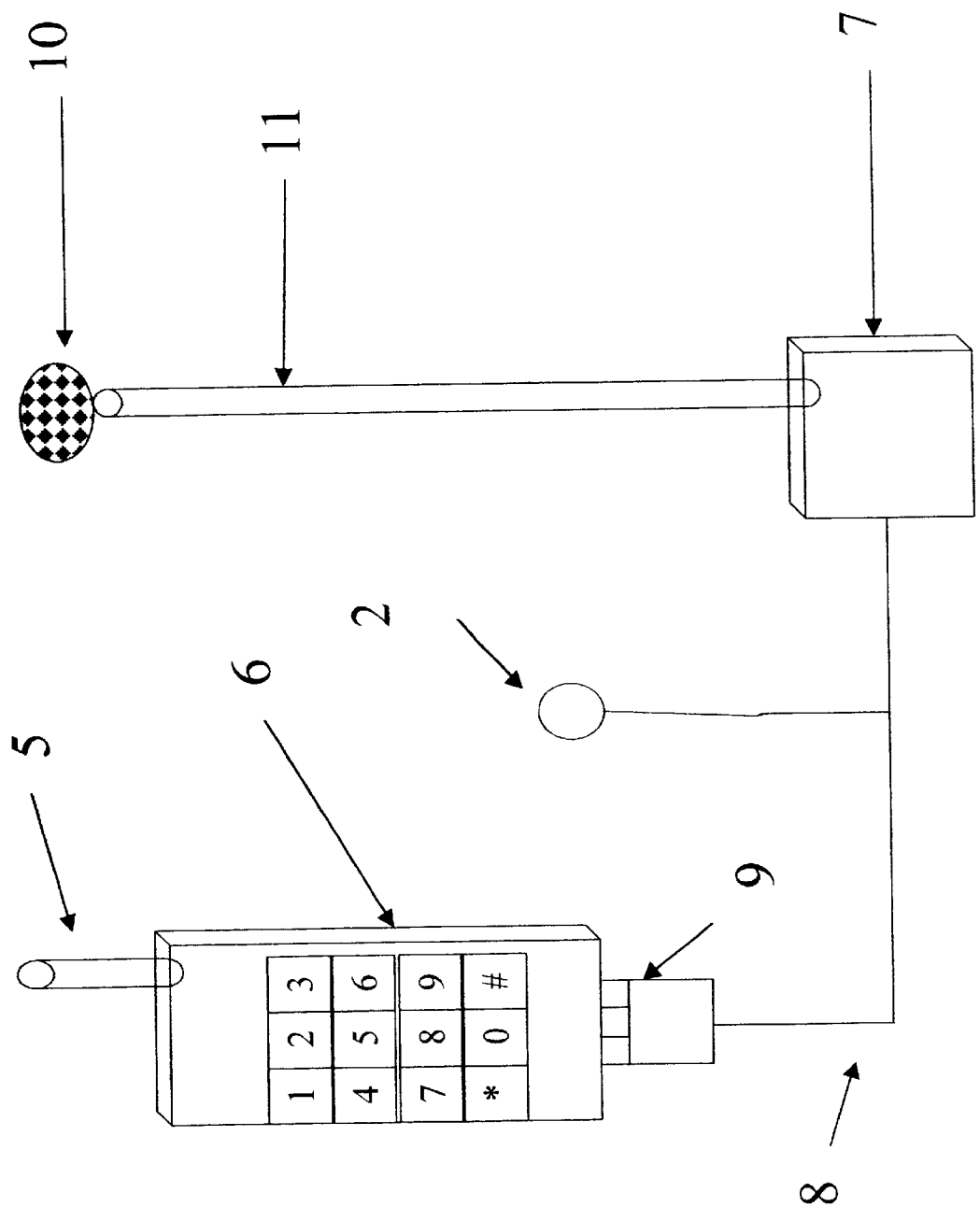
FIG. 2 shows a cellular telephone system in which a telephone is coupled to acoustical tube. The acoustical tube is coupled to a conversion device, which is coupled to the cellular telephone via electrical wire. The acoustical earpiece is coupled to the acoustical tube. The electric microphone is coupled to the cellular telephone by an electric wire.

As shown in FIG. 2, a cellular telephone 6 may be connected to conversion device 7 via an electrical wire 8 and electrical coupler 9. Conversion device 7 converts electrical signals into sound waves that in turn are transmitted to an acoustical earpiece 10 via an acoustical tube 11. Electrical microphone is coupled to cellular telephone 6 via an electrical wire 8 and electrical coupler 9.

Figure 3:
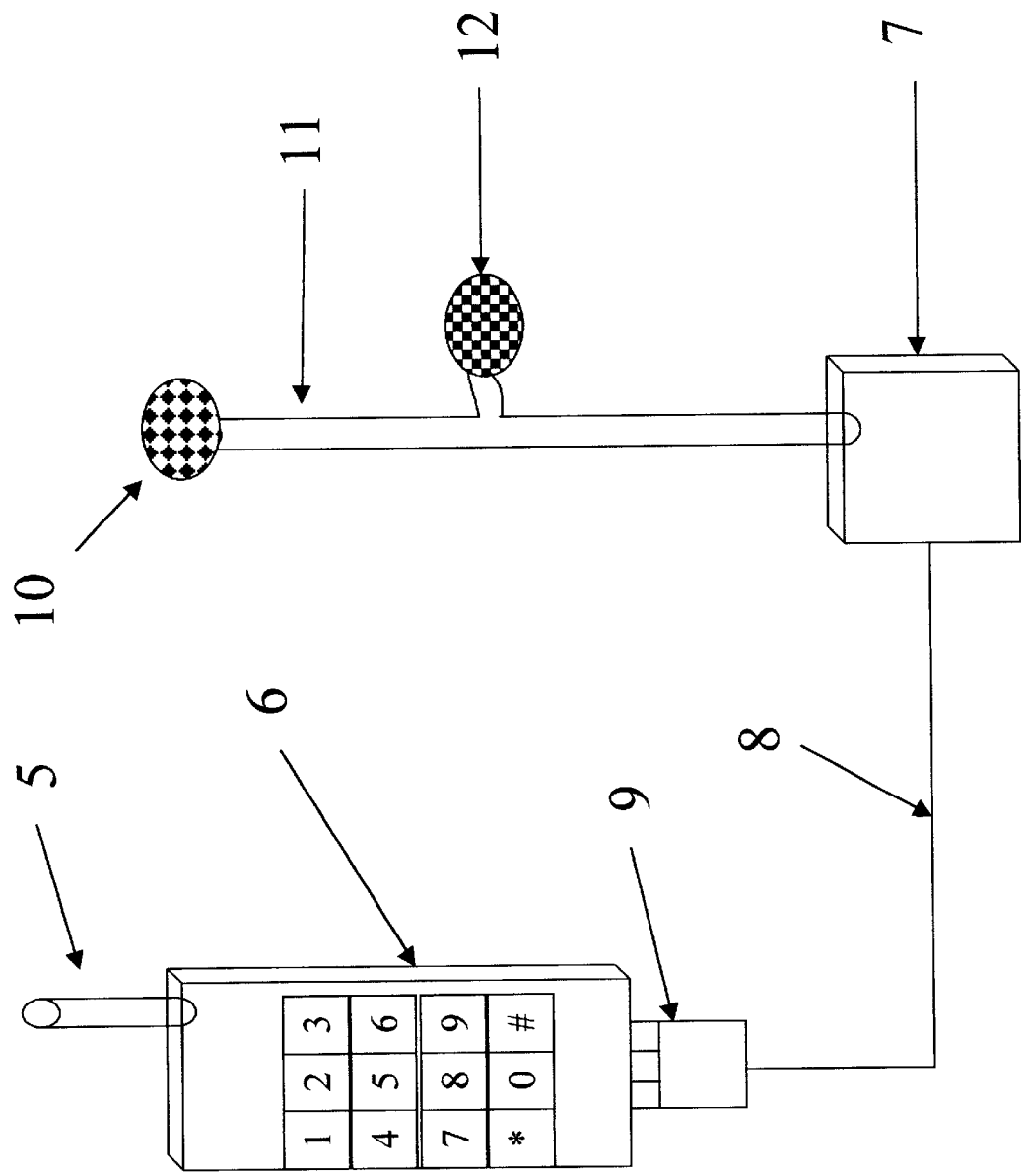
FIG. 3 shows a cellular telephone system in which a telephone is coupled to acoustical tube. The acoustical tube is coupled to a conversion device, which is coupled to the cellular telephone via electrical wire.

Referring is now made to FIG. 3, a cellular telephone 6 is connected to conversion device 7 via an electrical wire 8 and electrical coupler 9. Conversion device 7 converts electrical signals into sound waves that in turn are transmitted to an acoustical earpiece 10 via an acoustical tube 11. Speech is transmitted from an acoustical microphone 12 to the conversion device 7.

Figure 4:
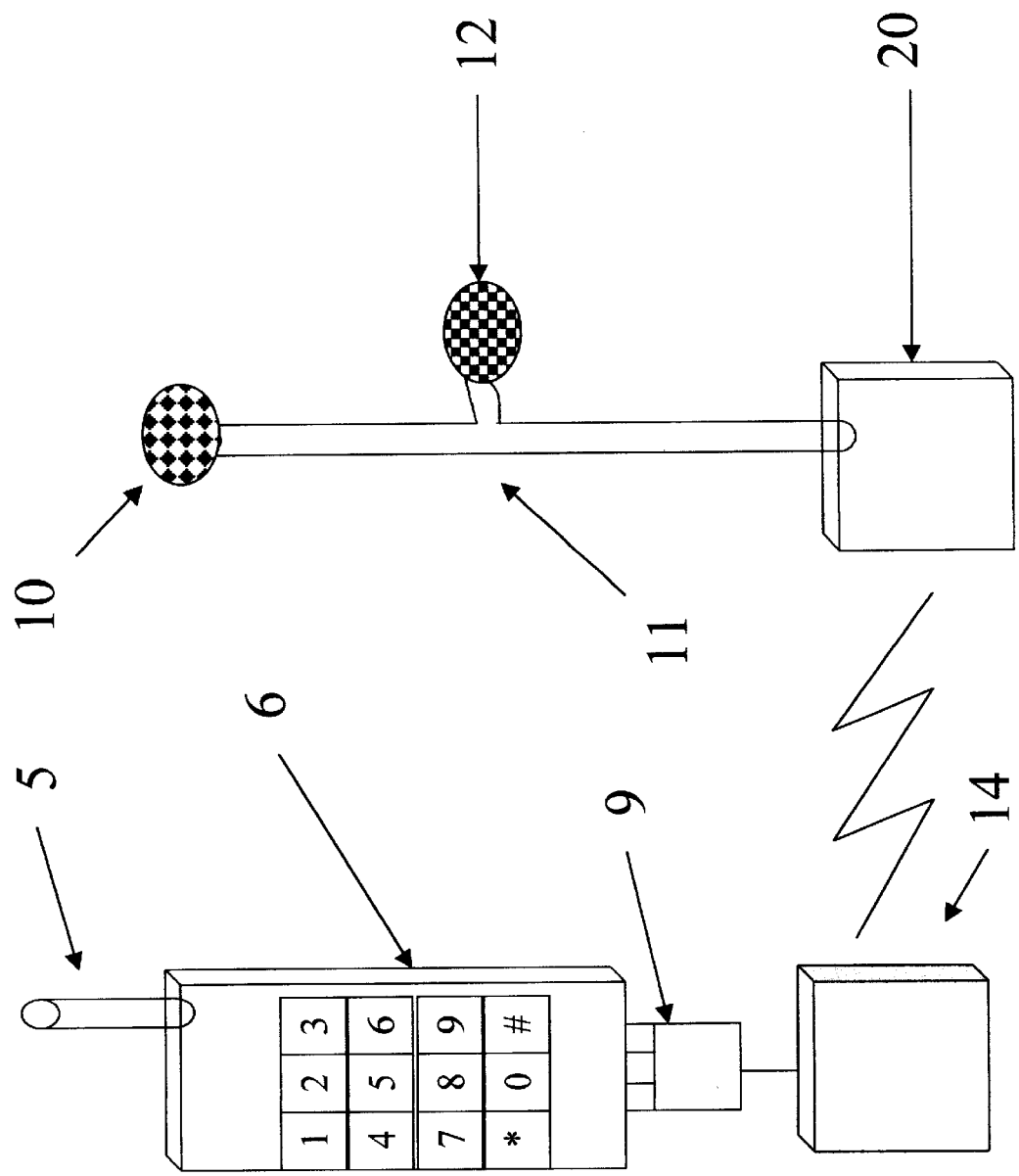
FIG. 4 shows a cellular telephone system in which a telephone is coupled without wires to acoustical tube. The acoustical tube is coupled to a first conversion device. A second conversion device is coupled to the cellular telephone via electrical wire. The two conversion devices exchange electromagnetic signals.

Referring is now made to FIG. 4. A cellular telephone 6 is connected to a proximal conversion device 14 via an electrical wire and electrical coupler 9. Conversion device 7 converts electrical signals into sound waves that in turn are transmitted to an acoustical earpiece 10 via an acoustical tube 11. Speech is transmitted from an acoustical microphone 12 to the conversion device 7. Conversion devices 7 and Referring is now made to FIG. 3. A cellular telephone 6 is connected to conversion device 7 via an electrical wire 8 and electrical coupler 9. Conversion device 7 converts electrical signals into sound waves that in turn are transmitted to an acoustical earpiece 10 via an acoustical tube 11. Speech is transmitted from an acoustical microphone 12 to the conversion device 7.

Figure 5:
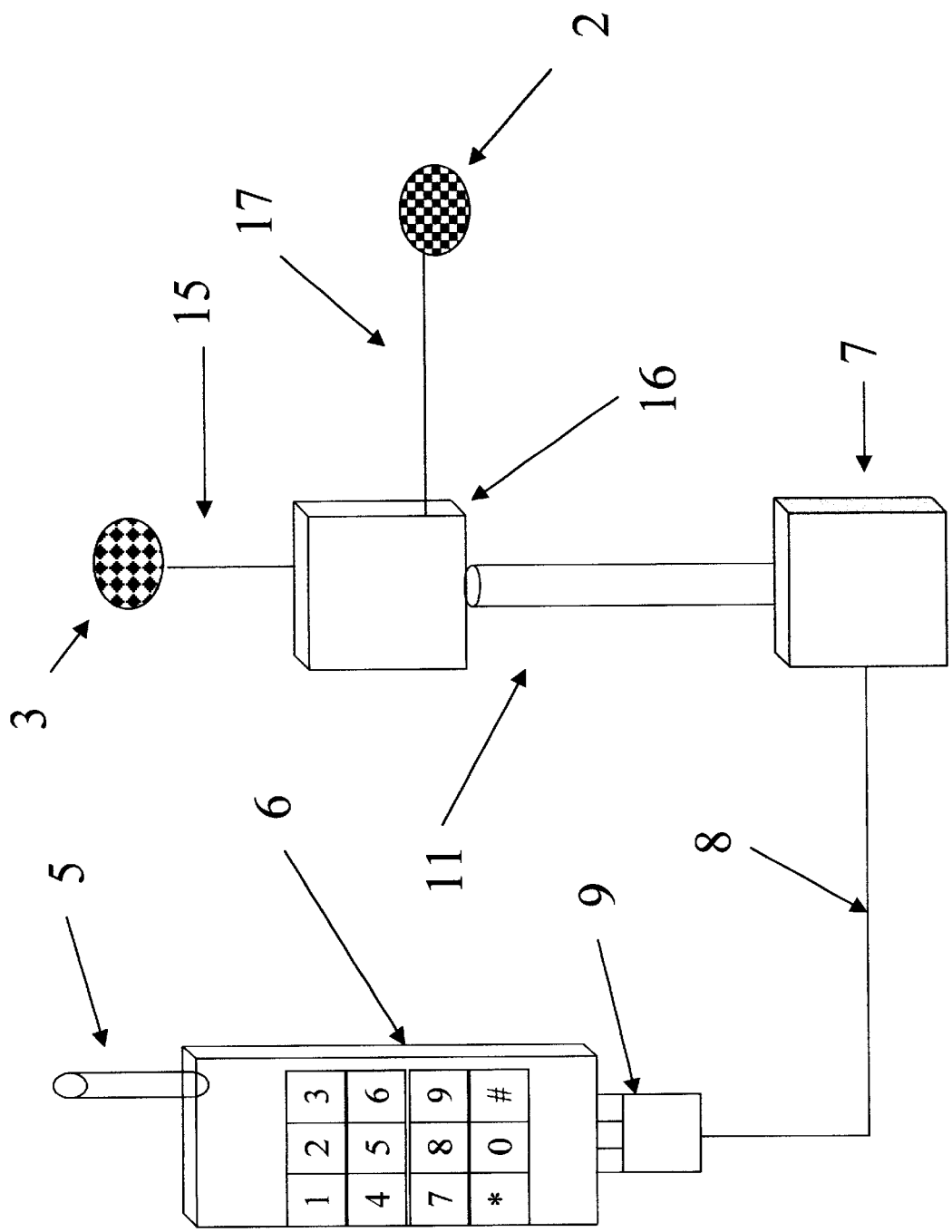
FIG. 5 shows a configuration of cellular telephone system having two conversion devices, one on each side of an acoustical tube. The two conversion devices exchange signals of mechanical waves.
Figure 6:
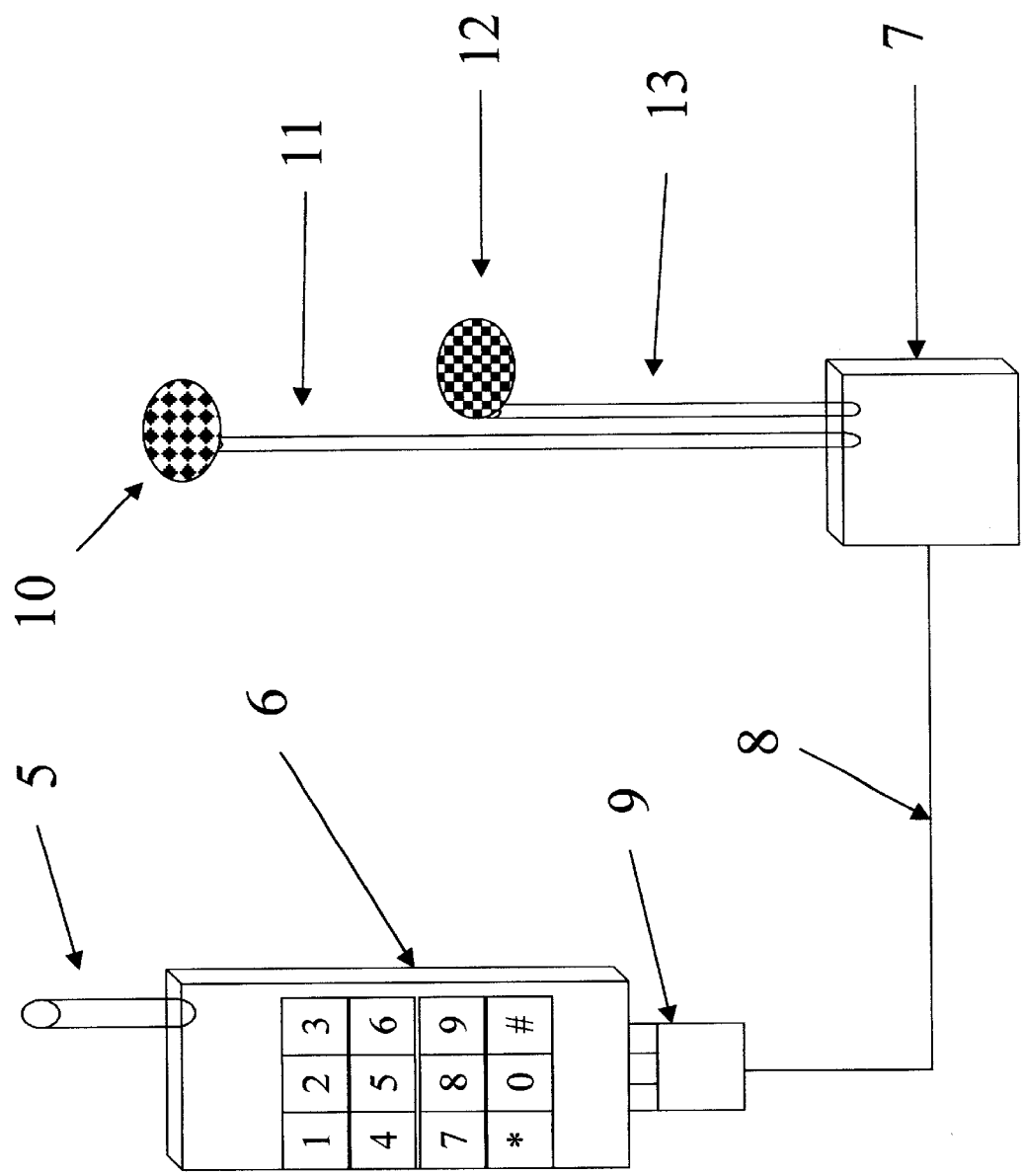
FIG. 6 shows a cellular telephone system in which a telephone is coupled to two acoustical tubes. Two acoustical tubes are coupled to a conversion device, which is coupled to the cellular telephone via electrical wire.
Figure 7:
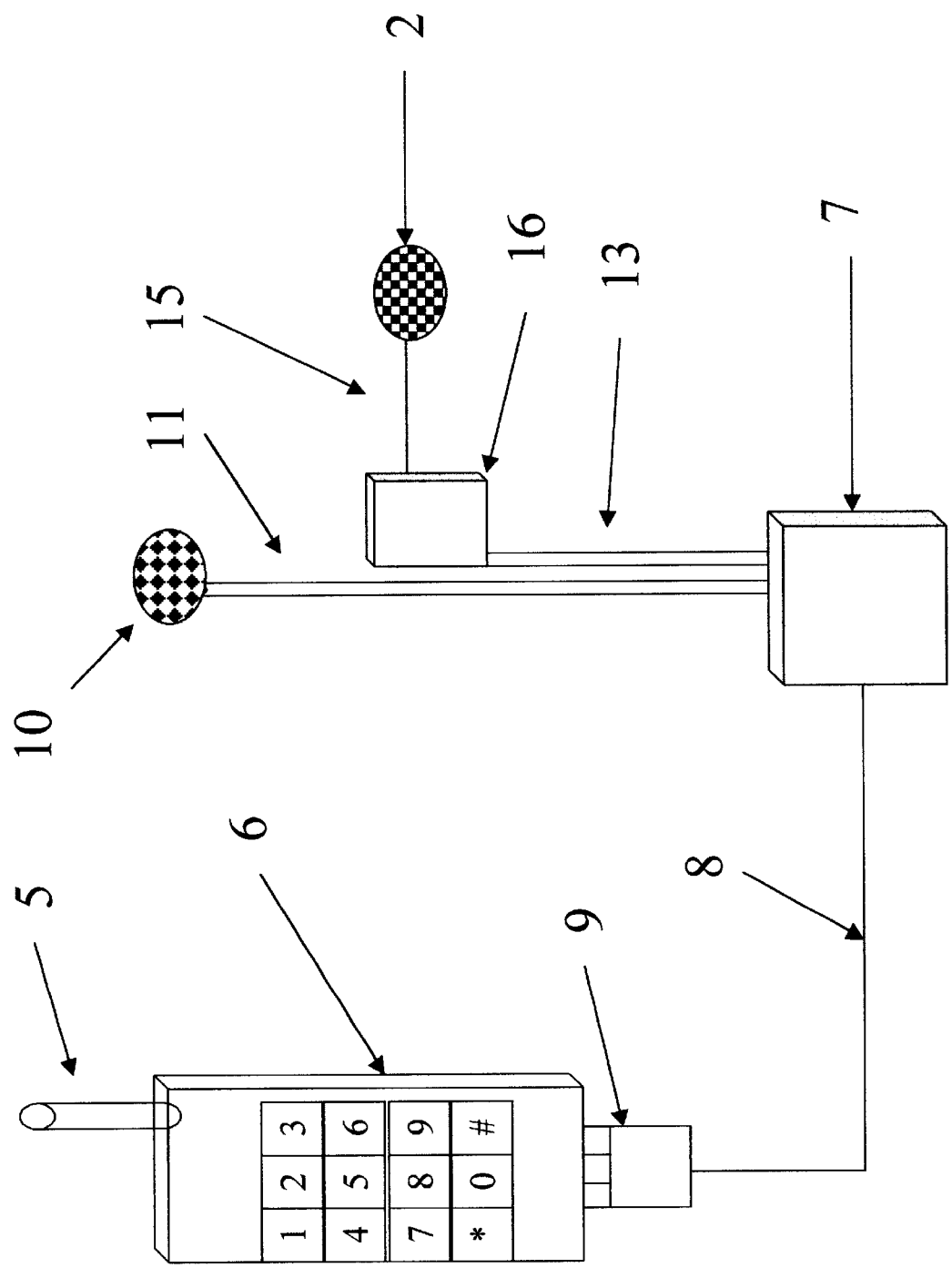
FIG. 7 shows a cellular telephone system in which a telephone is coupled to two acoustical tubes. The acoustical tubes are coupled to a first conversion device, which is coupled to the cellular telephone via electrical wire. One tube is coupled to a second conversion device, which is coupled to an electrical microphone by an electrical wire. A second tube is coupled to an earpiece.
Figure 8:
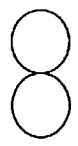
FIG. 8 is a cross sectional view of two acoustical tubes fused alongside.
Figure 9:
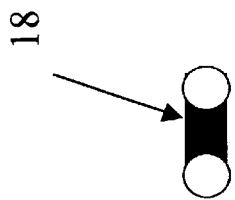
FIG. 9 is a cross sectional view of two acoustical tubes fused alongside and separated by a web.
Figure 10:
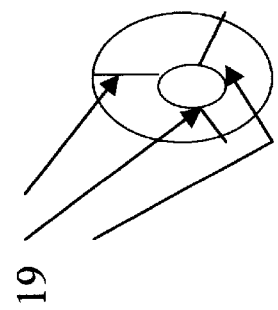
FIG. 10 is a cross sectional view of two concentric acoustical tubes with fins between their walls.

In an alternative embodiment, the cellular telephone system of the present invention may contain two conversion devices as illustrated in FIG. 5. In such a case, the telephone 6 is connected to a proximal conversion device 7 via an electrical wire 8. Conversion device 7 is connected to a distal conversion device 16 with an acoustical tube 11. Distal conversion device 16 is connected to electrical earpiece 3 and electrical microphone 2 with electrical wires 15 and 17. Proximal conversion device 7 may be connected directly to telephone 6 or may be an integral part of telephone 6.

Referring now to acoustical tube 11, it is made of (electrically) non-conducting, optionally flexible, material such as polyethylene, polypropylene, polyvinylchloride (PVC), etc., filled with a medium capable of conducting sound waves, such as plasma, gas, liquid, or solid. Instead of one tube, two tubes can be employed, one for receiving sound and another for transmission. Tubes may be separated by a web or fused with one another, wrapped together side by side or one inside the other as concentric tubes.

Branching may appear at any position along a tube. A tube with multiple branching tubes may be used as an announcement system for internal communication among the crew of a vehicle, an airplane, a vessel or any other need of internal communication.

The cross-section of tube 11 may be round, square or of any other geometry. One or more acoustical fittings such as quarter wavelength plate, a membrane or a funnel may be installed or embedded in a tube.

Conversion devices 7 and 16 are an essential part of the invention. They contain at least one transducer, which is a device capable of converting electrical signals into sound waves and/or vice versa. Conversion devices 14 and 20 contain a transceiver for exchanging electromagnetic signals. In addition, conversion devices 7, 14, 16, and 20 may contain any of the following:

An encryption device.

A decoder.

An amplifier circuit.

A filter circuit.

An internal power supplier, redundantly operated.

A micro controller.

A wireless transmitter/receiver.

A device for sending a signal to any entrance or any exit of the conversion device.

A device for changing a signal to any entrance or any exit of the conversion device.

A device that can control transmission of any signal to any entrance or any exit of the conversion device.

Some examples for possible configurations of conversion devices are shown in FIGS. 11, 12, 13 and 15.

Figure 11:
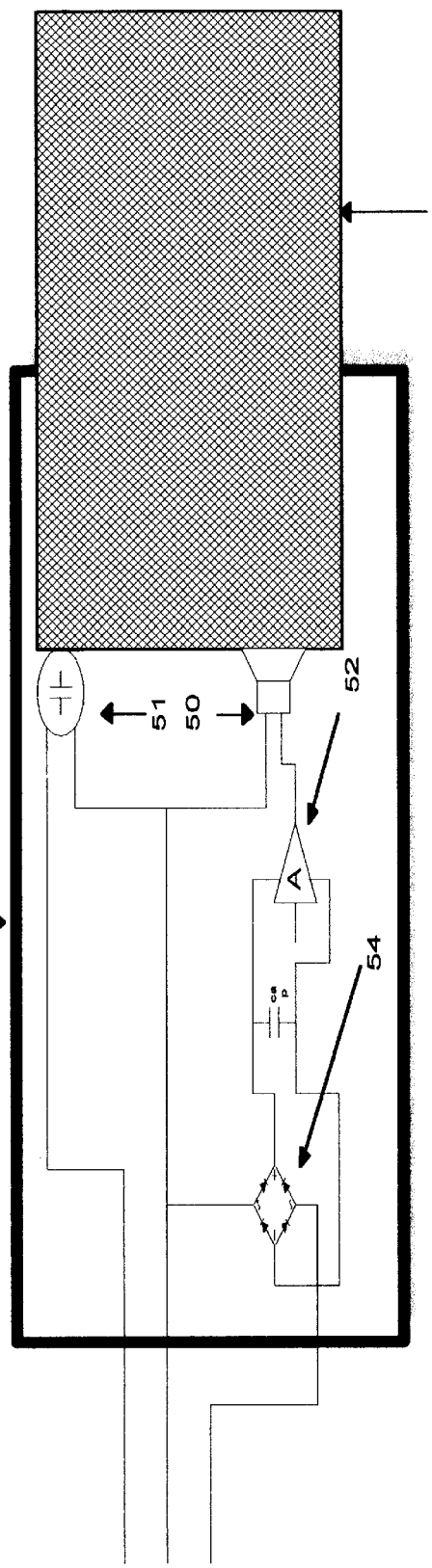
FIG. 11 is a diagram of a conversion device including a full-wave rectifier.

In a specifically preferred embodiment shown in FIG. 11, the invention is related to a conversion device 7 including a full-wave rectifier 54 with an amplifier 52 connected to the speaker 50, and an acoustical tube 11 for the microphone 51 and the speaker 50.

Figure 12:
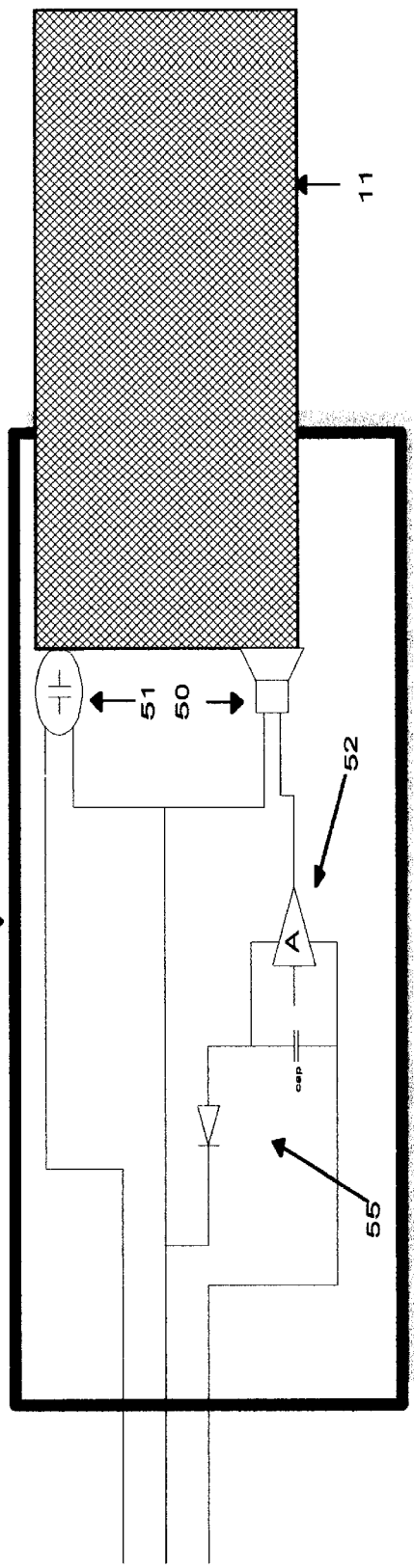
FIG. 12 is a diagram of a conversion device including a half-wave rectifier.

In another embodiment shown in FIG. 12, the invention is related to conversion device 7 including a half-wave rectifier 55 with an amplifier 52 in the path of speaker 50, and acoustical tubes 11 for the microphone 51 and the speaker 50.

Further, the invention is related to a conversion device 7 as shown in FIG. 13. Conversion device 7 comprises one amplifier 52 connected to earpiece 50, and one amplifier 53 connected to microphone 51, with separate acoustical tubes 11 for the microphone 51 and the earpiece 50. A power supplier 56 is connected to amplifiers 52 and 53. A momentary switch 74 may be installed for the purpose of controlling microphone 51. A switch 75 may be installed for the purpose of controlling the conversion device from the cellular telephone.

As shown in FIG. 14, a removable charger 58 may be installed, for charging of the power supplier 57. A switch 76 is used for coupling the amplifier 52 to the power supplier 57.

Still Further, the invention is related to a conversion device 7 as shown in FIG. 15. Conversion device 7 comprises a first amplifier 52 in the path of earpiece 50, and one amplifier 53 in the path of the microphone 51, with separate acoustical tubes 11 for a microphone 51 and an earpiece 50. Power to the amplifiers is supplied from the mobile telephone via electrical wires 60 and 61.

Figure 16:
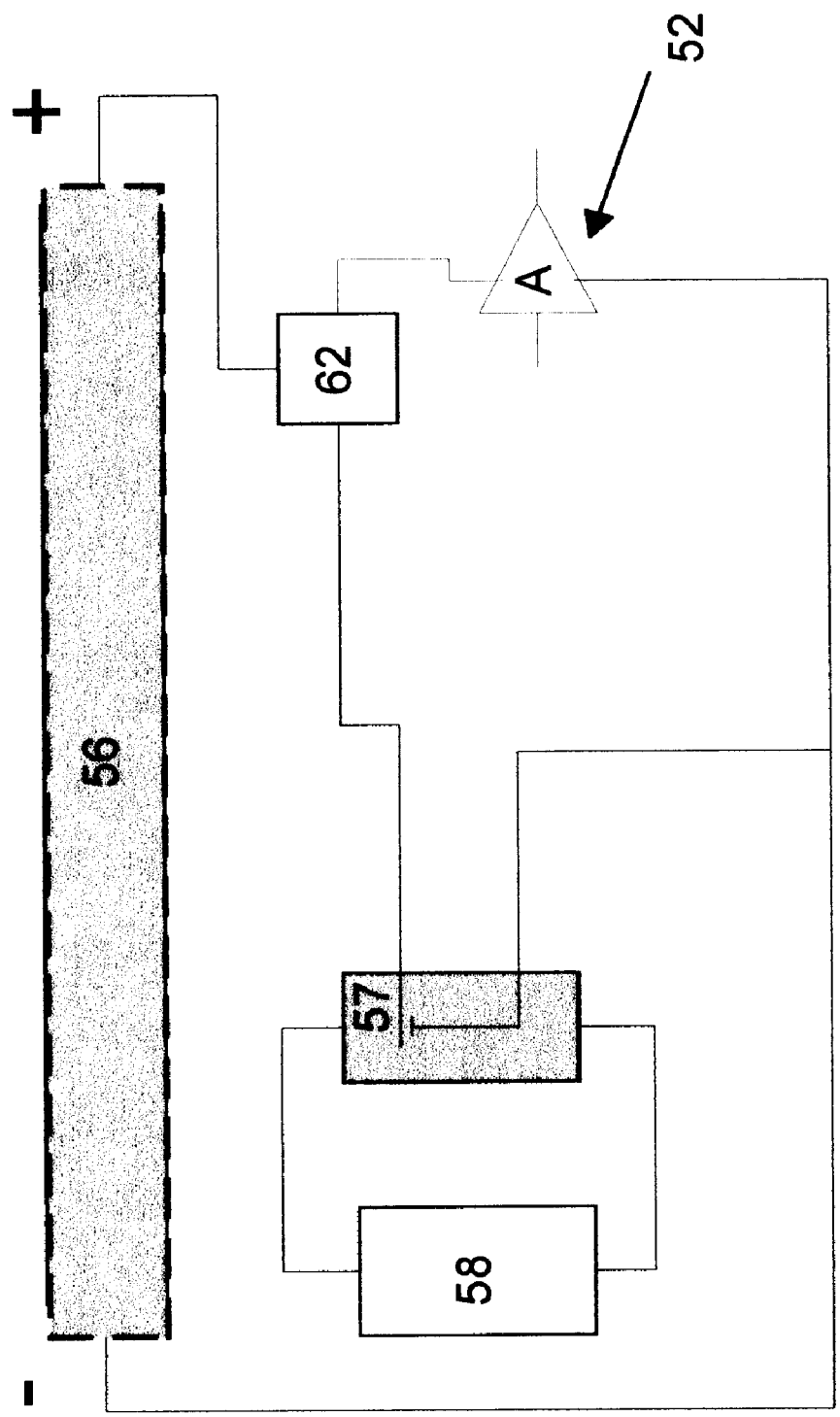
FIG. 16 is a diagram of a power supply system including two power supplies and a charger.

An example of a power supply system that can be utilized in the construction of conversion devices is shown in FIG. 16. The system comprises two power suppliers 56, 57 and a charger 58 controlled by a micro switch 62. The micro switch 62 selects the suitable power supplier for the amplifier 52 of the conversion device.

The use of an amplifier improves the transmission of sound waves and especially required for the transmission of sound wave to long distances.

The internal power supplier may be a battery, a solar cell, a wind vane, an apparatus for coupling kinetic energy to conversion device, or any other energy source. The power supplier may be connected to an amplifier.

Typical amplifiers are described in the following publications:
Ralph J. Smith, Circuits, Devices and Systems, second edition (1971), pp. 365, fig. 11.21 and pp. 376, fig. 11.31(a)
305 Circuits, Elcktor Elecktronice publishing (1995), ISBN 090570536x, pp. 19, fig. 924053-11.

Typical microphone amplifier circuit configurations are described in:
305 Circuits, Elcktor Elecktronice publishing, ISBN 090570536x, pp. 33, fig. 934039-11.

Typical filter circuit configurations are described in:
Ralph J. Smith, Circuits, Devices and Systems, second edition (1971), pp. 404, figs. 12.15(a), and 12.16(a).
305 Circuits, Elcktor Elecktronice publishing, ISBN 090570536x, pp. 31, Fig. 924095-11.

Typical wave rectifier circuit configurations are described in:
Ralph J. Smith, Circuits, Devices and Systems, second edition (1971), pp. 393, fig. 12.3(a).
305 Circuits, Elcktor Elecktronice publishing, ISBN 090570536x, pp. 14, fig. 914122-11; page 137, fig. 934024-11.

Typical relay circuit configurations are described in:
305 Circuits, Elcktor Elecktronice publishing, ISBN 090570536x, pp. 14, fig. 914122-11.

Typical charger circuit configurations are described in:
305 Circuits, Elcktor Elecktronice publishing, ISBN 090570536x, pp. 96, fig. 914004-11; pp. 103, fig. 914047-11.

An electrical microphone is defined as a device for the conversion of sound waves into an electrical signal. An electrical earpiece is defined as a device for the conversion of an electrical signal into sound waves.

Acoustical microphone and earpiece may optionally be unified in one device.

An electrical coupler is a device at one end of a wire or a conversion device with which it is attached to an input/output port of a cellular telephone.

Instead of a telephone, there may be a cell phone, a wireless transmitter/receiver, a computer, a CD player, a tape recorder, a DVD, a video camera or any other means of communication. When data is transmitted, electrical signals are converted into sound waves and vice versa.

In addition, the transmission of sound waves is insensitive to surrounding electromagnetic field.

Additional objects, advantages, and novel features of the present invention will become apparent to one ordinarily skilled in the art upon examination of the figures, which are not intended to be limiting.

What is claimed is:

1. A cellular telephone system to reduce radiation effects in proximity to the head of a user, the system comprising:
   (a) a cellular telephone for making and receiving cellular communication;
   (b) an electrical coupler coupled to said cellular telephone;
   (c) a conversion device electrically coupled to said coupler for receiving electrical signals and converting said electrical signals into acoustical signals;
   (d) an acoustical tube coupled at one end to convey said acoustical signals;
   (e) an acoustical earpiece coupled to the other end of said acoustical tube to be placed in the ear of a user;
   (f) an electrical microphone electrically coupled to said coupler via an electrical wire, in proximity of the mouth of the user when the earpiece is placed in user's ear, wherein said conversion device is positioned at a distance from the head of the user so as to reduce said radiation effects to the head of the user.

2. A cellular telephone system according to claim 1, wherein acoustical signals travel in one direction through a first acoustical tube, and acoustical signals in the opposite direction travel in a second acoustical tube.

3. A cellular telephone system according to claim 2, wherein acoustical tubes are fused alongside one another.

4. A cellular telephone system according to claim 2, wherein said tubes are concentric.

5. A cellular telephone system to reduce radiation effects in proximity to the head of a user, the system comprising:
   (a) a cellular telephone for making and receiving cellular communication;
   (b) an electrical coupler coupled to said cellular telephone;
   (c) a conversion device electrically coupled to said coupler for:
      (i) receiving electrical signals and converting said electrical signals into acoustical signals;
      (ii) receiving acoustical signals and converting them into electrical signals;
   (d) an acoustical tube coupled at one end to convey said acoustical signals;
   (e) an acoustical earpiece coupled to the other end of said acoustical tube to be placed in the ear of a user;
   (f) an acoustical microphone coupled to said acoustical tube and in proximity to the mouth of the user when the earpiece is placed in user's ear,
   wherein said conversion device is positioned at a distance from the head of the user so as to reduce said radiation effects to the head of the user.

6. A cellular telephone system according to claim 2, wherein acoustical signals travel in one direction through a first acoustical tube, and acoustical signals in the opposite direction travel in a second acoustical tube.

7. A cellular telephone system according to claim 6, wherein acoustical tubes are fused alongside one another.

8. A cellular telephone system according to claim 6, wherein said tubes are concentric.

9. A cellular telephone system to reduce radiation effects in proximity to the head of a user, the system comprising:
   (a) a cellular telephone for making and receiving cellular communication;
   (b) an electrical coupler coupled to said cellular telephone;
   (c) first conversion device electrically coupled to said coupler for:
      (i) receiving electrical signals and converting said electrical signals into acoustical signals;
      (ii) receiving acoustical signals and converting them into electrical signals;
   (d) first acoustical tube coupled at one end to said first conversion device to convey said acoustical signals;
   (e) an acoustical earpiece coupled to the other end of said first acoustical tube to be placed in the ear of a user;
   (f) second acoustical tube coupled at one end to said first conversion device to convey said acoustical signals;
   (g) second conversion device coupled to said second acoustical tube for receiving electrical signals and converting them into acoustical signals;
   (h) an electrical microphone coupled to second conversion device via an electrical wire, said electrical microphone is in proximity of the mouth of the user when the earpiece is placed in user's ear.

10. A cellular telephone system according to claim 9, wherein acoustical tubes are fused alongside one another.

11. A cellular telephone system according to claim 9, wherein said tubes are concentric.

12. A cellular telephone system to reduce radiation effects in proximity to the head of a user comprising:
   (a) a cellular telephone for making and receiving cellular communication;
   (b) an electrical coupler coupled to the said cellular telephone;
   (c) first conversion device electrically coupled to said coupler for:
      (i) receiving electrical signals and converting said electrical signals into acoustical signals;
      (ii) receiving acoustical signals and converting them into electrical signals;
   (d) an acoustical tube coupled at one end to said first conversion device to convey said acoustical signals;
   (e) second conversion device coupled to said acoustical tube for:
      (i) receiving electrical signals and converting said electrical signals into acoustical signals;
      (ii) receiving acoustical signals and converting them into electrical signals;
   (f) an electrical earpiece coupled to said second conversion device via an electrical wire, in proximity to the ear of the user.
   (g) an electrical microphone coupled to said second conversion device via an electrical wire, in proximity of the mouth of the user when the earpiece is placed in user's ear.

13. A cellular telephone system according to claim 12, wherein acoustical signals travel in one direction through a first acoustical tube, and acoustical signals in the opposite direction travel in a second acoustical tube.

14. A cellular telephone system according to claim 13, wherein acoustical tubes are fused alongside one another.

15. A cellular telephone system according to claim 13, wherein said tubes are concentric.

\* \* \* \* \*

UNITED STATES PATENT AND TRADEMARK OFFICE
CERTIFICATE OF CORRECTION

PATENT NO. : 6,377,824 B1
DATED : April 23, 2002
INVENTOR(S) : Ingbir et al.

It is certified that error appears in the above-identified patent and that said Letters Patent is hereby corrected as shown below:

Title page,
Insert:
-- [30] Foreign Application Priority Data
6, April 2000 [IL] Israel ............ 135501 --

Signed and Sealed this

First Day of April, 2003

JAMES E. ROGAN
*Director of the United States Patent and Trademark Office*